United States Patent
Kennedy

(10) Patent No.: US 11,873,908 B2
(45) Date of Patent: Jan. 16, 2024

(54) BUTTERFLY VALVE

(71) Applicant: MCWANE, INC.

(72) Inventor: Paul Kennedy, Horseheads, NY (US)

(73) Assignee: MCWANE, INC., Birmingham, AL (US)

(*) Notice: Subject to any disclaimer, the term of this patent is extended or adjusted under 35 U.S.C. 154(b) by 0 days.

(21) Appl. No.: 18/165,778

(22) Filed: Feb. 7, 2023

(65) Prior Publication Data

US 2023/0184336 A1 Jun. 15, 2023

Related U.S. Application Data

(63) Continuation of application No. 17/144,419, filed on Jan. 8, 2021, now Pat. No. 11,598,427.

(51) Int. Cl.
*F16K 31/53* (2006.01)
*F16K 1/22* (2006.01)
*F16K 27/02* (2006.01)

(52) U.S. Cl.
CPC .......... *F16K 1/221* (2013.01); *F16K 27/0218* (2013.01); *F16K 31/535* (2013.01)

(58) Field of Classification Search
CPC ...... F16K 31/041; F16K 31/05; F16K 31/055; F16K 31/535; F16K 31/54; F16K 27/0218; F16K 27/0227; F16K 1/221; F16K 1/224; F16K 1/2028; F16K 1/2007
See application file for complete search history.

(56) References Cited

U.S. PATENT DOCUMENTS

| | | | |
|---|---|---|---|
| 889,282 A | 6/1908 | Webster | |
| 3,147,766 A * | 9/1964 | Herring | F16K 31/535 |
| | | | 74/509 |
| 3,385,120 A * | 5/1968 | Mence | F16H 25/20 |
| | | | 74/509 |
| 3,570,373 A * | 3/1971 | Tupker | F16K 31/1635 |
| | | | 92/138 |
| 3,877,677 A | 4/1975 | Daghe et al. | |
| 4,023,432 A * | 5/1977 | Killian | F16D 3/265 |
| | | | 74/89.36 |
| 4,065,979 A | 1/1978 | Killian | |
| 4,380,246 A | 4/1983 | Casale et al. | |
| 4,625,758 A * | 12/1986 | Murray | F16K 31/502 |
| | | | 137/554 |
| 4,693,128 A * | 9/1987 | Plow | F16H 25/20 |
| | | | 74/89.33 |

(Continued)

FOREIGN PATENT DOCUMENTS

| | | | | |
|---|---|---|---|---|
| DE | 102004062924 A1 * | 7/2006 | ............ | F02D 11/106 |
| GB | 915197 A | 1/1963 | | |
| GB | 1194244 A | 6/1970 | | |

*Primary Examiner* — Hailey K. Do
(74) *Attorney, Agent, or Firm* — Brown & Michaels, PC

(57) ABSTRACT

A butterfly valve includes a body, a gear assembly, a shaft, a Scotch yoke actuator on the shaft, and a gear box cover. The body has a fluid conduit and a gear platform supported on and over the fluid conduit. The shaft passes through the gear platform. The gear assembly is supported on the gear platform and includes a valve stem with a first threaded portion and includes a pin nut with a second threaded portion engaging the first threaded portion. The Scotch yoke actuator engages the pin nut. The gear box cover defines an internal cavity sized to house the gear assembly.

4 Claims, 5 Drawing Sheets

(56) References Cited

U.S. PATENT DOCUMENTS

| | | | |
|---|---|---|---|
| 4,961,538 A * | 10/1990 | Hewitt | F16K 1/221 |
| | | | 239/582.1 |
| 7,303,180 B1 | 12/2007 | O'Shea | |
| 2004/0183040 A1 | 9/2004 | Kvvon | |
| 2007/0042190 A1 * | 2/2007 | Yamada | C08G 18/671 |
| | | | 428/413 |
| 2011/0024659 A1 | 2/2011 | Kim | |
| 2012/0313025 A1 | 12/2012 | Takai et al. | |
| 2013/0105718 A1 | 5/2013 | Fache et al. | |
| 2017/0232285 A1 | 8/2017 | Magee | |
| 2018/0292012 A1 | 10/2018 | Kwasniewski et al. | |

* cited by examiner

Fig. 3
Fig. 4
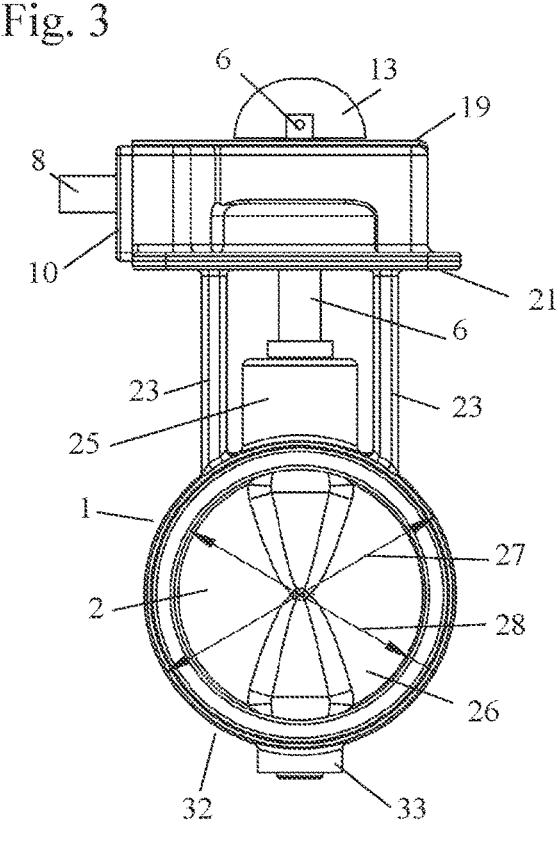
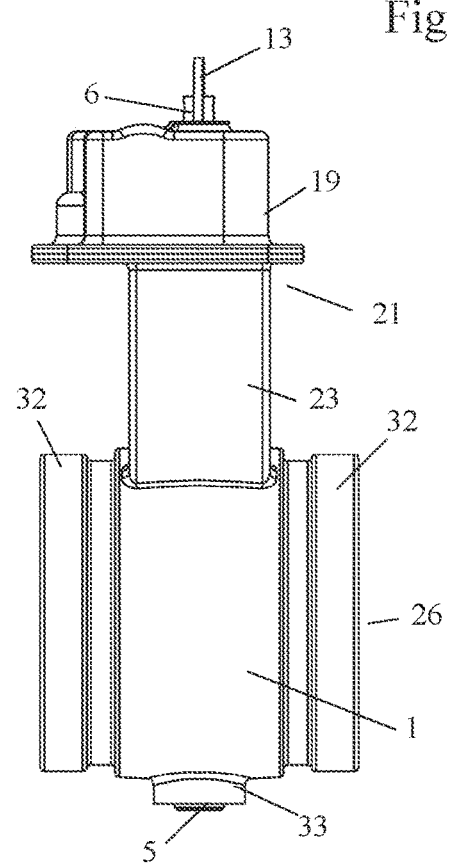
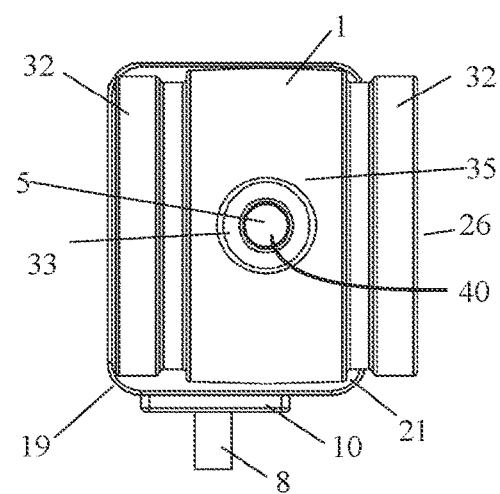
Fig. 5

BUTTERFLY VALVE

REFERENCE TO RELATED APPLICATIONS

This application is a continuation application of co-pending U.S. patent application Ser. No. 17/144,419, filed Jan. 8, 2021, entitled "Butterfly Valve". U.S. patent application Ser. No. 17/144,419 is incorporated herein by reference.

BACKGROUND OF THE INVENTION

Field of the Invention

The invention pertains to the field of valves. More particularly, the invention pertains to butterfly valves.

Description of Related Art

A butterfly valve regulates the flow of fluid. The valve has a body with a passage, through which fluid can be allowed to flow, or through which fluid flow can be blocked by a closing mechanism. The closing mechanism is a disk in the passage that rotates from an open position parallel with an axis of the valve body to a closed position perpendicular with the axis of the valve body. A gearbox attached to the valve body encases internal components that facilitate rotation of the disk between the open position and the closed position. In conventional butterfly valves, the gearbox has four sides integral with a base, and top plate to enclose the remaining side. The base and four sides of the gear box, being integral with the body of the valve, are formed from a material such as iron or steel, which are more substantial than, for example, aluminum. To meet certain industry standards, the body of the valve must be made from a more substantial material like iron or steel in order to better keep the valve open in the case of a fire. The components inside the gear box can be accessed for maintenance by removing the top plate. Access to the internal components through the space occupied by the top plate is restricted by the four sides integral with the base.

SUMMARY OF THE INVENTION

A butterfly valve disclosed herein has improved accessibility to the components inside the gear box, lowered weight, decreased manufacturing cost, and increased manufacturing ease.

In one embodiment, a butterfly valve includes: a body having a fluid conduit and a gear platform supported on and over the fluid conduit, the gear platform configured to support a gear assembly for actuating a valve disk between an open position and a closed position; and a gear box cover defining an internal cavity, the internal cavity sized to house the gear assembly, the gear box cover configured to be removably mounted to the platform such that the internal cavity is between the gear box cover and the platform.

In another embodiment, a butterfly valve includes: a body having a first opening, a second opening, a third opening, and a passage extending between the first opening and the second opening, the passage having a first axis, the third opening having a second axis transverse to the passage; a disk within the passage, the disk having an open position wherein the disk is non-perpendicular to the axis of the body and a closed position wherein the disk is perpendicular to the axis of the body; a platform supported on the body, the platform having a first opening aligned with the third opening of the body; a gear assembly supported on the platform; a shaft coupled to the disk, the shaft passing through the third opening of the body and the first opening of the platform; and a gear box cover having a plurality of sides defining an internal cavity, the internal cavity sized to house the gear assembly, the gear box cover configured to be removably mounted to and covering the platform.

In another embodiment a butterfly valve includes: a body having a first portion, a second portion, and a passage with an axis, a first bearing case extending from the first portion of the body, the first bearing case having an opening therethrough to pass a shaft; a second bearing case on the second portion of the body, the second bearing case aligned with the opening of the first bearing case; a platform supported over the first portion of the body, the platform having an opening to pass a shaft, the opening of the platform aligned with the opening of the first bearing case; a valve stem supported on the platform by a support, the valve stem having a threaded portion; a pin nut having a pin and a threaded portion engaging the threaded portion of the valve stem; a disk within the passage of the body, the disk having an open position wherein the disk is non-perpendicular to the axis of the passage and a closed position wherein the disk is perpendicular to the axis of the passage; a first shaft including a first end coupled to the disk, a second end opposite the first end, and a length between the first end of the first shaft and the second end of the first shaft, the length passing through the opening of the first bearing case and the opening of the platform; a Scotch yoke actuator on the length between the platform and the second end of the first shaft, the Scotch yoke having a slot fitting the pin on the pin nut; a second shaft having a first end coupled to the disk, a second end in the second bearing case, and a length between the first end of the second shaft and the second end of the second shaft; and a gear box cover removably mounted to and covering the platform, the gear box cover having a first opening to pass the first shaft, the gear box cover having a second opening to pass the valve stem.

BRIEF DESCRIPTION OF THE DRAWING

FIG. 3 shows an end view of the butterfly valve of FIG. 1.

FIG. 4 shows a side view of the butterfly valve of FIG. 1.

FIG. 5 shows a bottom view of the butterfly valve of FIG. 1.

DETAILED DESCRIPTION OF THE INVENTION

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
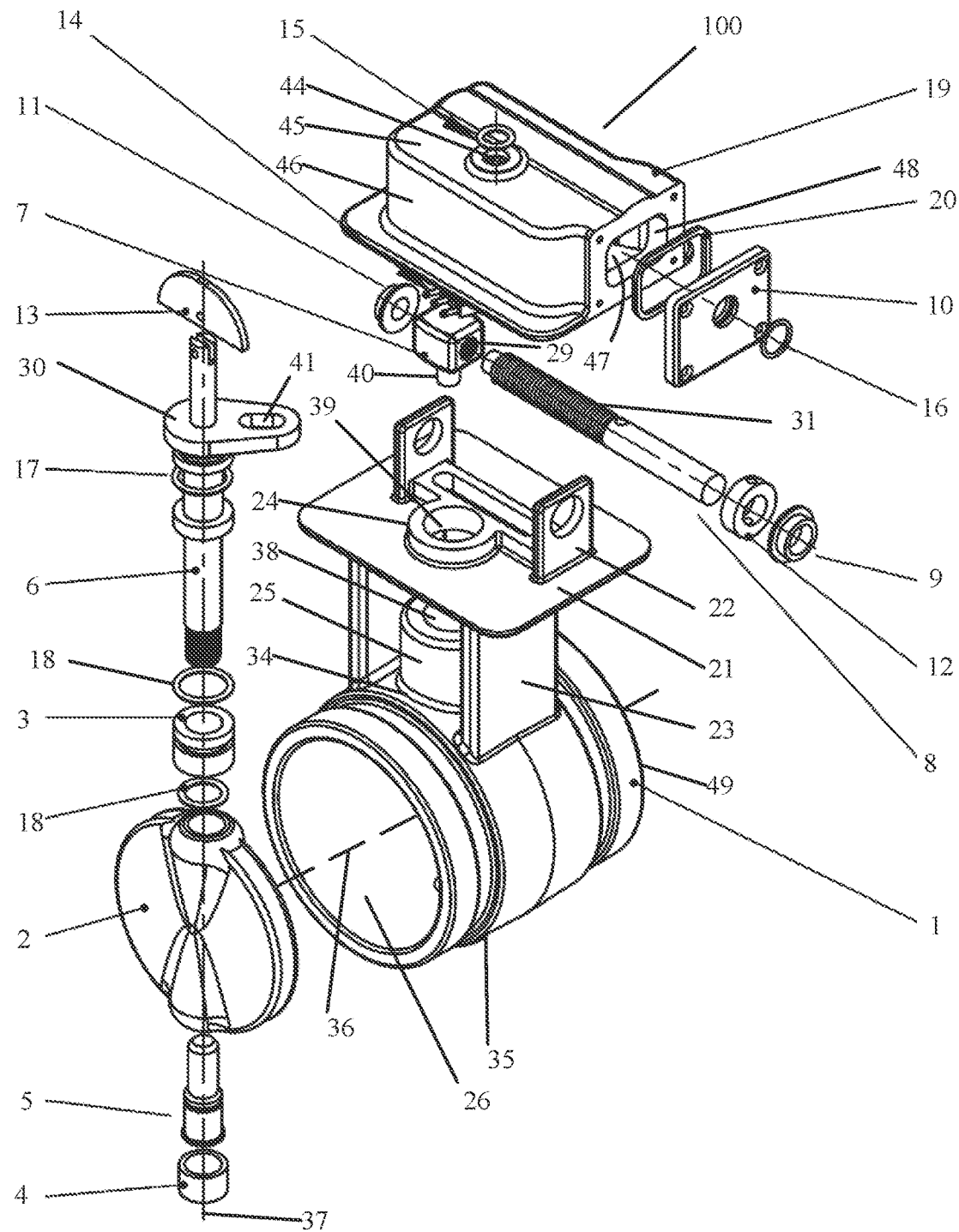
FIG. 1 shows an exploded view of the butterfly valve, according to an embodiment.
Figure 2:
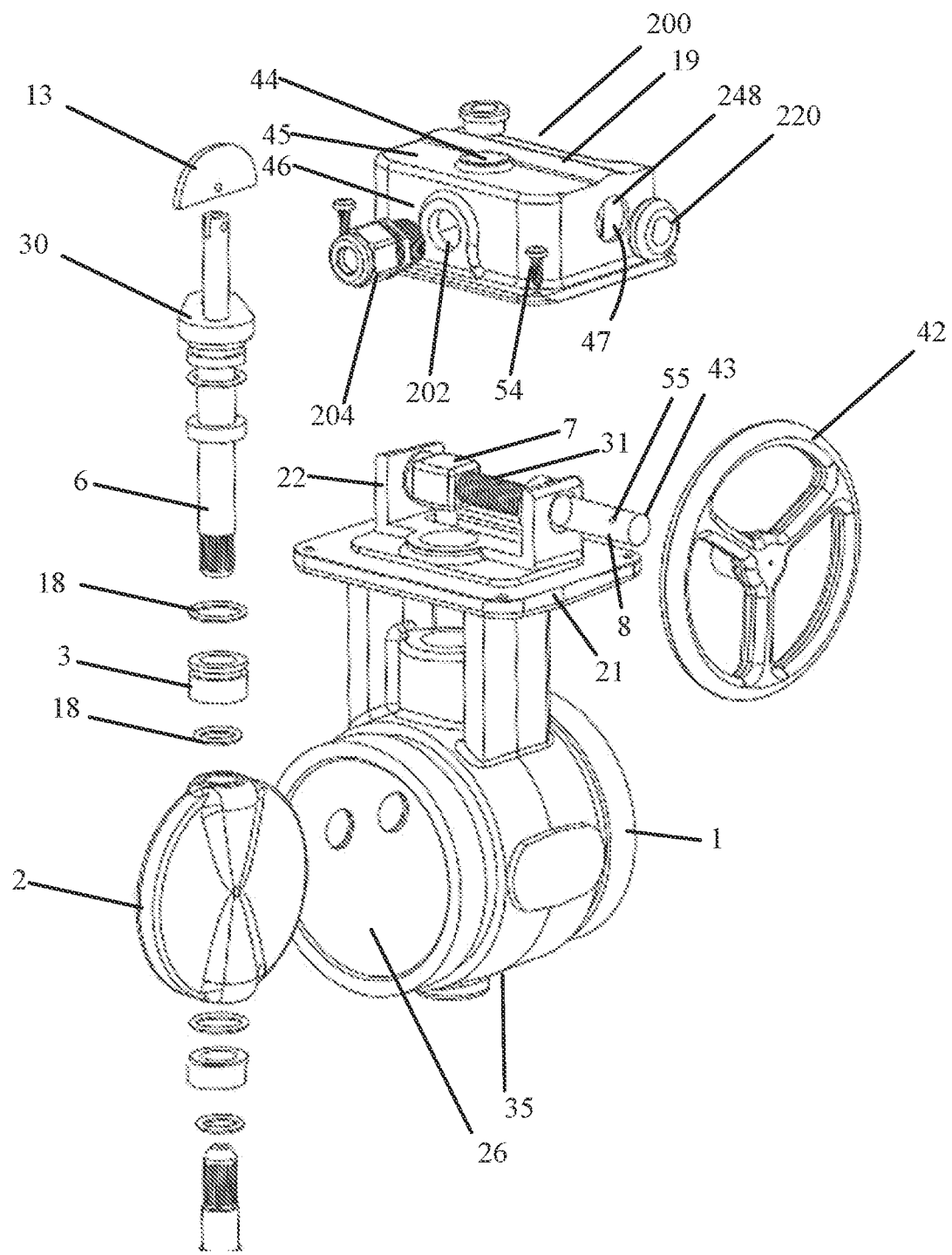
FIG. 2 shows a partially exploded view of a butterfly valve, according to an embodiment.

FIG. 1 shows an exploded view of a butterfly valve 100. FIG. 2 shows a partially exploded view of a second butterfly valve 200. FIG. 3 shows a side view of the valve 100. FIG. 4 shows a view of the valve 100 from the right-hand side of FIG. 1. FIG. 5 shows a view of the valve 100 from the bottom of valve 100. Identical reference numbers are used in all of the figures to refer to the same elements of the valve 100, 200.

Referring to FIGS. 1-5, the valve 100, 200 has a body 1 with a base or platform 21 supported on the body 1 by supports 23. The body 1, the supports 23, and the platform 21 can be formed, e.g., cast, as one integral unit. The body 1, including the supports 23 and the platform 21 can be formed of iron. Other materials with suitably strong and fire resistant characteristics can alternatively be used. A central passage 26 leads through a fluid conduit 49 of the valve body 1. The fluid conduit 49 has fittings on either end of the passage to permit the valve 100, 200 to be fitted into a pipe or other fluid conduit. These fittings are shown in the drawing as flanges 32 having an inner diameter 27, which is larger than the diameter 28 of the passage 26, although it will be understood that other fittings can be used as needed by the valve application.

The body 1 has an upper bearing case 25 formed on an upper surface or portion 34 of the body 1, a lower bearing case 33 formed on a lower surface or portion 35 of the body 1, and a platform bearing case 24 formed on the platform 21.

A circular disk 2 fits within the passage 26. When the disk 2 is in a fully open position wherein the disk 1 is parallel to an axis 36 of the valve body, fluid can flow through the passage 26 in the body 1 nearly unobstructed. When the disk 2 is rotated to a closed position wherein the disk 2 is perpendicular to the axis 36 of the valve body 1, the disk 2 blocks fluid flow through the passage 26. Intermediate positions of the disk 2 can be used to control flow through the passage 26 between full flow and no flow, as is well known in the art.

The disk 2 is supported and rotated by a lower shaft 5 and an upper shaft 6, which are each fastened to the disk 2 on a rotational axis 37 of the disk. This fastening can be accomplished by screwing threaded ends of lower shaft 5 and upper shaft 6 into mating sockets on the disk 2, or by other means known to the art. The lower shaft 5 is supported within the body 1 by lower bearing 4 fitting within lower bearing case 33, and the upper shaft 6 is supported within the body 1 by upper bearing 3 fitting within upper bearing case 25. O-rings 18 can be provided on either side of the upper bearing 3 to minimize fluid leakage around the bearing 3. The upper shaft 6 passes through the platform 21 through the platform bearing case 24. The upper bearing case 25 and body 1 have an opening 38, and the platform bearing case 24 and platform 21 have an opening 39, the openings 38, 39 aligned and sized to fit around the upper shaft 6. The lower bearing case 33 may have a central opening 40 extending also through the lower portion 35 of the body 1 to permit the lower shaft 5 to extend outside of the body 1 as shown in the drawing.

The platform 21 supports components of a gear assembly, a valve position indicator assembly, and a removable gear box cover or hood 19. As part of the gear assembly, the valve stem 8 is mounted with bushes 9, 11 and lock nut 12 to the platform 21 by a flange or support 22. The valve stem 8 has a threaded portion 31, which mates with a threaded portion 29 of a pin nut 7, so that rotation of the valve stem 8 causes linear movement of the pin nut 7 along an axis of the valve stem 8. The valve stem 8 can be rotated automatically, or as illustrated in FIG. 2, manually, such as by rotating a handwheel 42 attached to an end 43 of the valve stem 8. The handwheel 42 can be fastened to the valve stem 8 using conventional methods, such as with a screw through the handwheel into screw hole 55.

A Scotch yoke actuator arm 30 is mounted on the upper shaft 6 at a position above the threaded portion 31 of the stem 8, in some embodiments by casting the Scotch yoke actuator arm 30 with the upper shaft 6. Pin nut 7 has a pin 40 which fits within a slot 41 in the Scotch yoke actuator 30, so that as the valve stem 8 rotates and the pin nut 7 moves linearly, the Scotch yoke actuator arm 30 rotates. As a result, the disk 2 also rotates.

Figure 6:
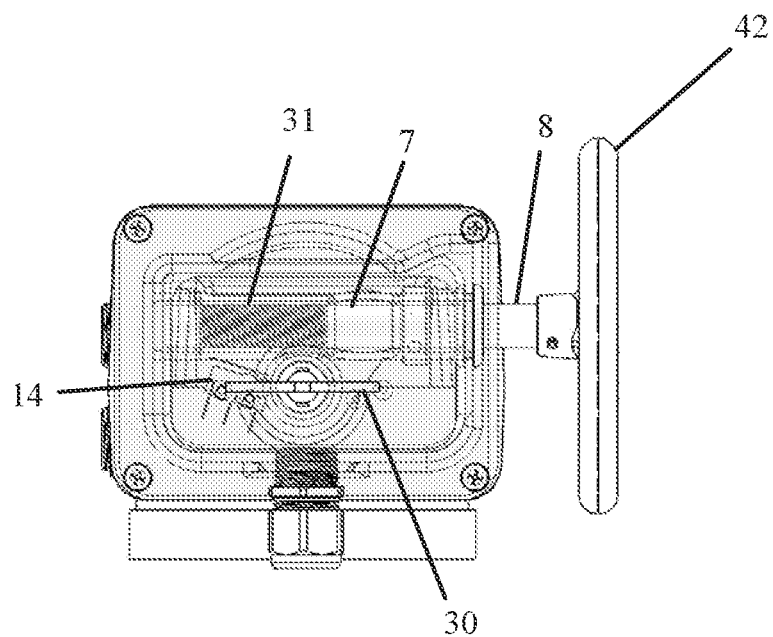
FIG. 6 shows a transparent top view of a limit switch in a closed-circuit position, according to the embodiment of the butterfly valve of FIG. 2.
Figure 7:
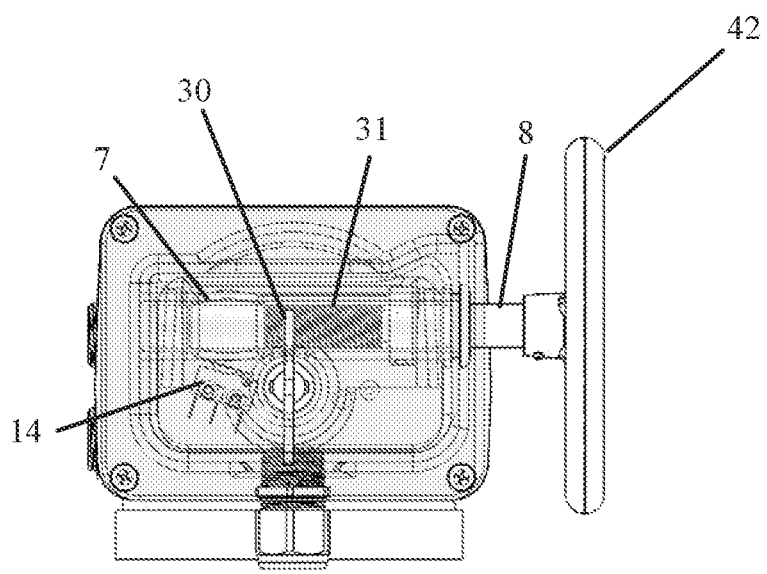
FIG. 7 shows a transparent top view of the limit switch of FIG. 6 in an open-circuit position.

As part of the valve position indicator assembly, rotation of the Scotch yoke actuator arm 30 also operates at least one limit switch 14 for remote indication of the position of the disk 2. FIG. 6 shows a transparent top view of the limit switch 14 in a closed-circuit position, and FIG. 7 shows a transparent top view of the limit switch 14 in an open-circuit position. The pin nut 7 and limit switch 14 can be arranged such that the limit switch 14 is actuated when the valve disk 2 is at either the open position or the closed position, or while the valve disk 2 is between the open and closed positions. Alternatively, separate limit switches 14 can be provided to be operated by the pin nut 7 at each of the open and closed positions. If desired, a flag or indicator 13 can be mounted on the top end of the upper shaft 6 to visually signal the position of the disk 2 to an operator. The upper shaft 6 can extend through an opening 44 in a top side 45 of the gear box cover 19.

Figure 8:
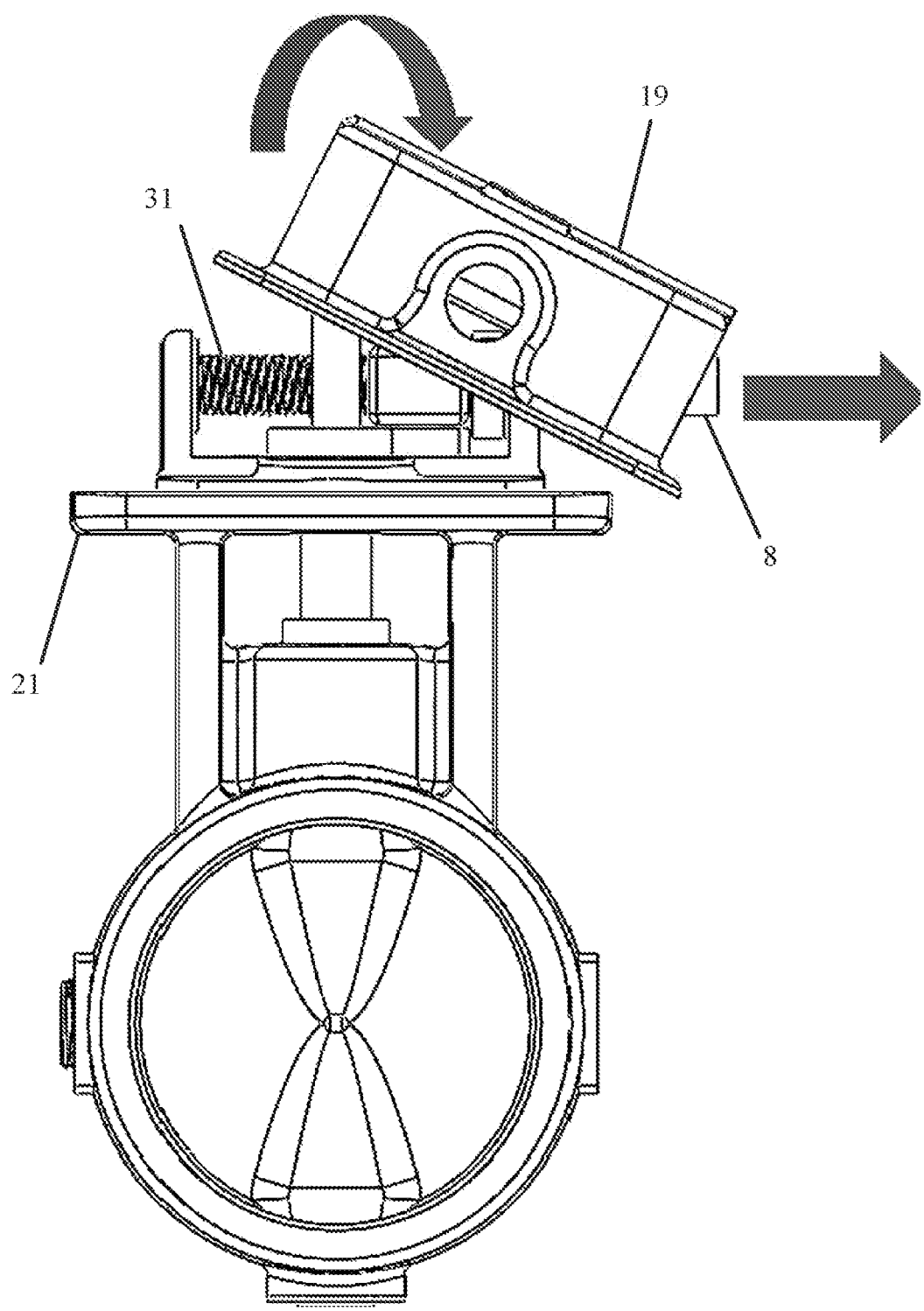
FIG. 8 shows disassembly of a gear box cover from a butterfly valve, according to the embodiment of FIG. 2.

Referring again to FIGS. 1-5 and also to FIG. 8, which illustrates removal of the gear box cover 19, the removable gear box cover 19 can cover the threaded portion 31 of the stem 8, the Scotch yoke actuator 30, the pin nut 7, the limit switch 14, and any other components mounted on or above the platform 21. The gear box cover 19 has a plurality of sides, including the top side 45 and four perimeter sides 46, which together define an internal cavity 47. The gear box cover 19 can be shaped alternatively, such that the top side 45 and four perimeter sides 46 can be considered a different number of sides, or a one or more rounded or curved sides, to create the internal cavity 47. The internal cavity 47 is sized to house components of the gear assembly and the valve position indicator assembly. The gear box cover 19 can relatively easily be fastened and unfastened from the platform 21, such as by tightening or loosening fasteners 54 (e.g., screws) shown in FIG. 2. After unfastening the fasteners, as shown in FIG. 8, the gear box cover 19 can be tilted at one end. If the handwheel 42 is removed, the gear box cove 19 can further be slid off the valve stem 8. Because the gear box cover 19 is detachable from the platform 21 and body 1 rather than integral with the platform 21 and body 1, the gear box 19 can be classified as a switch cover and the gear box 19 can allow the butterfly valve 100, 200 to meet the necessary industry standards, including fire ratings, while more easily and inexpensively being fabricated from a machinable, lighter material, such as aluminum. Removal of the gear box cover 19 also permits much easier access to the components within the internal cavity 47, as opposed to conventional removal of just the top side 45.

As shown in FIG. 1, one of the perimeter sides 46 has a side opening 48, which can be covered by a side plate 10. The side plate 10 has a further opening sized to fit and mount bushing 9. The side plate 10 closes the side opening 48 around the stem 8 or bushing 9. Gasket 20 and o-rings 15, 16, 17 provide a seal against dirt and moisture entry into the gear box cover 19. While the gear box cover 19 is removable so that components under the gear box cover 19 are easily accessible, the side opening 48 and the side plate 10 also provide access without removal of the entire gear box cover 19.

FIG. 2 shows an alternate side opening 248, which is sized smaller than the side opening 48, to fit the stem 8 and a gasket 220. The gasket seals between the valve stem 8 and one of the perimeter side 46. FIG. 2 also shows an opening 202 and a conduit connector 204 to allow entry/exit of an electrical supply 201 or other communication path, to power and/or communicate with the limit switch 14.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A butterfly valve comprising:
a body having a fluid conduit and a gear platform, the gear platform supported on and over the fluid conduit, the gear platform being formed integrally with the body;
a gear assembly to actuate a valve disk between an open position and a closed position, the gear assembly directly mounted to the gear platform, the gear assembly including:
a valve stem having a first threaded portion; and
a pin nut having a second threaded portion engaging the first threaded portion;
a shaft passing through the gear platform;
a Scotch yoke actuator on the shaft, the Scotch yoke actuator engaging the pin nut; and
a gear box cover defining an internal cavity, the internal cavity sized to house the gear assembly, the gear box cover configured to be removably mounted to the gear platform separate from the gear assembly.

2. The butterfly valve of claim 1, wherein the body is made of iron and the gear box cover is made of aluminum.

3. A butterfly valve comprising:
a body having a fluid conduit and a gear platform, the gear platform supported on and over the fluid conduit, the gear platform formed integrally with the body;
a gear assembly configured to actuate a valve disk between an open position and a closed position, the gear assembly directly mounted to the gear platform, the gear assembly including:
a valve stem supported on the gear platform, the valve stem having a first threaded portion; and
a pin nut having a second threaded portion engaging the first threaded portion;
a shaft passing through the gear platform;
a Scotch yoke actuator on the shaft, the Scotch yoke actuator engaging the pin nut; and
a gear box cover defining an internal cavity, the internal cavity sized to house the gear assembly, the gear box cover configured to be mounted and unmounted from the gear platform while leaving the gear assembly supported on the gear platform.

4. A butterfly valve comprising:
a body having a fluid conduit and a gear platform, the gear platform supported on and over the fluid conduit, the gear platform formed integrally with the body;
a gear assembly configured to actuate a valve disk between an open position and a closed position, the gear assembly directly mounted to the gear platform, the gear assembly including:
a valve stem supported on the gear platform, the valve stem having a first threaded portion; and
a pin nut having a second threaded portion engaging the first threaded portion;
a shaft passing through the gear platform;
a Scotch yoke actuator on the shaft, the Scotch yoke actuator engaging the pin nut; and
a gear box cover defining an internal cavity, the internal cavity sized to house the gear assembly, the gear box cover having an open side configured to receive the gear assembly into the internal cavity, the open side of the gear box cover configured to be removably mounted to the gear platform to enclose the gear assembly in the internal cavity.

\* \* \* \* \*